No. 774,586. PATENTED NOV. 8, 1904.
A. JUDKA.
MANUFACTURE OF BISCUIT CUPS.
APPLICATION FILED FEB. 20, 1904.
NO MODEL.
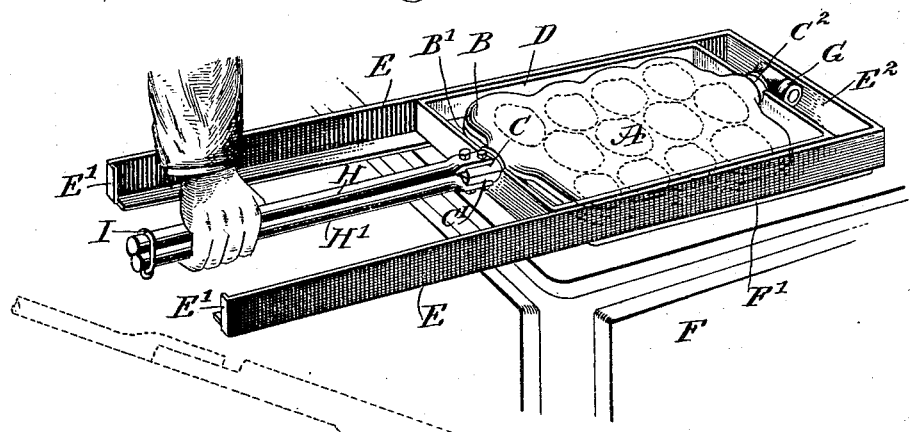
Fig. 1.
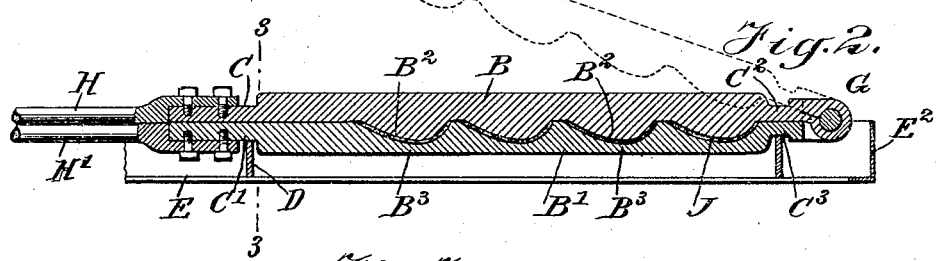
Fig. 2.
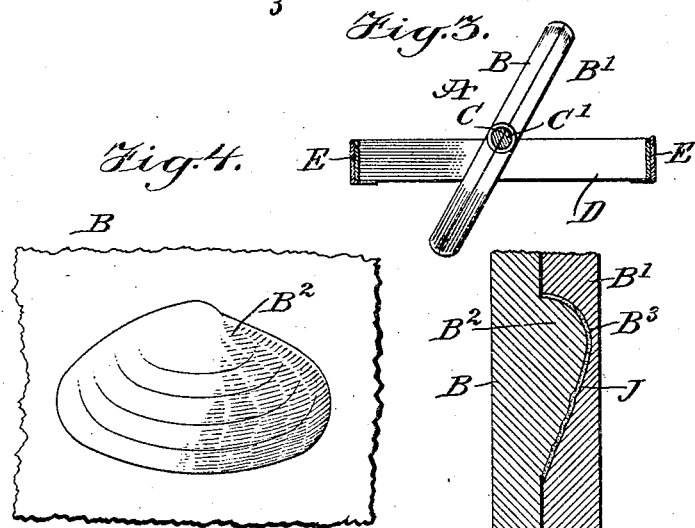
Fig. 3.
Fig. 4.
Fig. 5.
WITNESSES:
INVENTOR
Abraham Judka
BY
ATTORNEYS No. 774,586. Patented November 8, 1904.

UNITED STATES PATENT OFFICE.

ABRAHAM JUDKA, OF NEW YORK, N. Y.

MANUFACTURE OF BISCUIT CUPS.

SPECIFICATION forming part of Letters Patent No. 774,586, dated November 8, 1904.

Application filed February 20, 1904. Serial No. 194,521. (No model.)

*To all whom it may concern:*

Be it known that I, ABRAHAM JUDKA, a citizen of the United States, and a resident of the city of New York, (Coney Island, borough of Brooklyn,) in the county of Kings and State of New York, have invented new and useful Improvements in the Manufacture of Biscuit Cups, of which the following is a full, clear, and exact description.

The invention relates to biscuit cups to be filled with ice-cream, candies, &c.; and its object is to provide certain new and useful improvements in the manufacture of biscuit cups whereby a uniform baking of the biscuit dough in the baking-iron is obtained, a large number of biscuit cups are simultaneously and uniformly baked at each operation, and the operator is enabled to quickly manipulate the baking-iron.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is an enlarged sectional side elevation of the same. Fig. 3 is a transverse section of the same, showing the baking-iron partly turned over, on the line 3 3 of Fig. 2. Fig. 4 is a face view of part of one of the mold-plates, and Fig. 5 is an enlarged sectional side elevation of the mold-plates and the biscuit cup in position therein.

The improved apparatus for making biscuit cups consists, essentially, of a baking-iron A, which combines a mold and an oven and which is formed of two flat metallic plates B and B', provided with integral half-trunnions or trunnion-sections C C' and $C^2$ $C^3$, which when the plates B and B' are closed form whole trunnions adapted to turn in half-journals formed on the front and rear ends of a skeleton slide D, mounted to move in guideways E, either set on or forming part of a furnace or baking-oven F, having in its top an opening F', through which passes the heat for baking the biscuit dough into solid biscuit cups, as hereinafter more fully described. The outer terminals of the half-trunnions $C^2$ and $C^3$ extend beyond the rear end of the slide D and are connected with each other by a hinge G, the pintle of which extends transversely, and the axis of the pintle lies in the plane of the inner or opposing faces of the flat plates B and B'. The forward ends of the guideways E extend beyond the front of the furnace or baking-oven F, and the front terminals of the guideways are provided with stops E' to limit the outward sliding movement of the slide D, the inward movement of which is limited by the hinge G, abutting against the rear end $E^2$ of the guideways at the time the slide D is pushed into a rearmost position in the guideways.

On the forward trunnion-sections C and C' are bolted or otherwise secured handles H and H', extending lengthwise and adapted to be fastened together at their outer ends by a link or loop I for holding the plates B and B' locked in a closed position.

As illustrated in Figs. 1 and 2, the opposing or inner faces of the plates B and B' are provided one with integral cores $B^2$ and the other with indented molds $B^3$—that is, a core $B^2$ fits into a corresponding mold $B^3$ in such a manner as to leave sufficient space between the core and its corresponding mold for receiving the dough used to form the biscuit cups J, as shown in Figs. 2 and 5. As illustrated in Fig. 2, the indented molds $B^3$ are formed in the inner face of the plate B', but do not extend to the outer flat face thereof, so as to leave the latter completely unobstructed, the same as the outer face of the other plate B, from the inner face of which depend the integral cores $B^2$, as previously explained.

The apparatus is used as follows: In order to fill the several molds $B^3$ with the dough, the operator having hold of the handles H and H' pulls the iron A and with it the slide D outwardly until the slide abuts against the stops E', whereby the baking-iron A is drawn free and clear of the heat from the furnace or baking-oven F. The loop I is now removed and the handle H is swung upwardly, as indicated in dotted lines in Fig. 2, to open the baking-iron to allow of pouring the dough in measured quantities into the several molds B³, of which there are preferably twelve, as indicated in Fig. 1. When this has been done, then the handle H is swung downward to close the baking-iron, so that the cores B² press the dough into shape in each mold, and then the loop I is placed in position on the handles H and H' and the slide D, with the baking-iron A, is moved rearward in the guideway E', so as to bring the baking-iron in position over the opening F' of the furnace or oven F for the heat thereof to act on the plates B' and B to bake the dough. During the process of baking it is desirable to turn the baking-iron A so as to expose the other plate B more directly to the heat emanating from the furnace or oven F, and for this purpose the operator quickly turns the baking-iron by the trunnions revolving in their bearings in the slide D for the heat to act more directly on the other plate B to complete the baking of the cups. When this has been done, the slide D and baking-iron A are again moved into an outermost position, and then the baking-iron is opened and the biscuit cups are removed from the molds and the latter are refilled with dough, and the above-described operation is repeated.

It is understood that, if desired, the baking-iron A may be conveniently turned when in a rearmost position for insuring a uniform baking of the cups; but after the plates B and B' are once thoroughly heated it is only necessary to expose each plate B and B' for a short time to the heat from the furnace or oven F to complete the baking of the cups.

As shown in the drawings, the molds B³ and cores B² are so shaped as to form biscuit cups in the shape of half of a shell, thus rendering the cups not only easy to handle, but allowing of conveniently filling the same with ice-cream, candies, and the like, and also permitting convenient eating thereof, together with their contents, by the purchasers.

The dough for forming the biscuit cups consists, preferably, of best white flour, one hundred pounds; butter, ten pounds; yolks of twenty eggs; sugar, twenty pounds; water, about four gallons, the several ingredients being thoroughly mixed and poured into the baking-iron molds, as above described.

As a rule it takes but from three to four minutes to bake the cups in the baking-iron A.

Having thus described my invention, I claim as new and desire to secure by Letters Patent—

1. An apparatus for baking biscuit cups, consisting of two flat metal mold-plates connected together by a hinge and provided with handles, the opposing inner faces of the said plates being provided one with integral cores and the other with indented molds in the metal of such face, into which the core fits, with a small space between the core and its corresponding mold, the plates having trunnions in the direction of the length of the plates, a bearing in which the trunnions are journaled, the bearing being in the form of a slide, and a guideway in which the bearing is mounted to slide in the direction of the axis of the trunnions, as set forth.

2. An apparatus for baking biscuit cups, consisting of two flat metal mold-plates connected together by a hinge and provided with handles, the opposing inner faces of the said plates being provided one with integral cores and the other with indented molds in the metal of such face, into which the core fits, with a small space between the core and its corresponding mold, the plates having trunnions in the direction of the length of the plates, a bearing in which the trunnions are journaled, the bearing being in the form of an open-frame slide, and a guideway in which the bearing is mounted to slide in the direction of the axis of the trunnions, as set forth.

3. An apparatus for baking biscuit cups, consisting of two flat metal mold-plates connected together by a hinge and provided with handles, the opposing inner faces of the said plates being provided one with integral cores and the other with indented molds in the metal of such face, into which the core fits, with a small space between the core and its corresponding mold, the plates having trunnions in the direction of the length of the plates, a bearing in which the trunnions are journaled, the bearing being in the form of an open-frame slide, a guideway in which the bearing is mounted to slide in the direction of the axis of the trunnions, and stops for limiting the sliding motion of the bearing, as set forth.

4. An apparatus for baking biscuit cups, consisting of two flat metal mold-plates connected together by a hinge and provided with handles, the opposing inner faces of the said plates being provided one with integral cores and the other with indented molds in the metal of such face, into which the core fits, with a small space between the core and its corresponding mold, the core and mold representing half of a shell, the plates having trunnions in the direction of the length of the plates, and a bearing in which the trunnions are journaled, as set forth.

In testimony whereof I have signed my name to this specification in the presence of two subscribing witnesses.

ABRAHAM JUDKA.

Witnesses:
 THEO. G. HOSTER,
 EVERARD BOLTON MARSHALL.